United States Patent
Ishibashi

(10) Patent No.: US 11,774,242 B2
(45) Date of Patent: Oct. 3, 2023

(54) CONTROL SYSTEM FOR WORK MACHINE

(71) Applicant: KOMATSU LTD., Tokyo (JP)

(72) Inventor: Eiji Ishibashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 242 days.

(21) Appl. No.: 17/420,247

(22) PCT Filed: Feb. 17, 2020

(86) PCT No.: PCT/JP2020/006052
§ 371 (c)(1),
(2) Date: Jul. 1, 2021

(87) PCT Pub. No.: WO2020/171016
PCT Pub. Date: Aug. 27, 2020

(65) Prior Publication Data
US 2022/0065628 A1 Mar. 3, 2022

(30) Foreign Application Priority Data
Feb. 19, 2019 (JP) .................. 2019-027646

(51) Int. Cl.
*G01C 11/06* (2006.01)
*E02F 9/20* (2006.01)
(Continued)

(52) U.S. Cl.
CPC .............. *G01C 11/06* (2013.01); *E02F 9/20* (2013.01); *E02F 9/264* (2013.01); *G01C 15/00* (2013.01)

(58) Field of Classification Search
CPC ... E02F 3/847; E02F 9/166; E02F 9/20; E02F 9/205; E02F 9/264; E02F 9/265; G01C 11/04; G01C 11/06; G01C 15/00
See application file for complete search history.

(56) References Cited

U.S. PATENT DOCUMENTS 4,895,440 A 1/1990 Cain et al.
6,062,317 A * 5/2000 Gharsalli ............... E02F 3/845
701/50
(Continued)

FOREIGN PATENT DOCUMENTS

CN 1738947 A 2/2006
CN 105960492 A 9/2016
(Continued)

OTHER PUBLICATIONS

The Office Action for the corresponding Chinese application No. 202080008591.0, dated May 23, 2022.
(Continued)

*Primary Examiner* — Tyler J Lee
(74) *Attorney, Agent, or Firm* — Global IP Counselors, LLP

(57) ABSTRACT

A work machine includes a work implement and a vehicle body including a first vehicle body portion, a mount attached to the first vehicle body portion, and a second vehicle body portion supported on the first vehicle body portion via the mount. A control system for the work machine includes a vehicle body positional sensor, a work implement positional sensor, and a controller. The vehicle body positional sensor is attached to the second vehicle body portion and outputs vehicle body position data indicative of a position of the second vehicle body portion. The work implement positional sensor is attached to the second vehicle body portion and outputs work implement position data indicative of a relative position of the work implement with respect to the second vehicle body portion. The controller calculates a position of the work implement based on the vehicle body position data and the work implement position data.

17 Claims, 8 Drawing Sheets

(51) Int. Cl.
    *E02F 9/26*     (2006.01)
    *G01C 5/00*     (2006.01)
    *G01C 15/00*    (2006.01)

(56)        References Cited

U.S. PATENT DOCUMENTS

| | | | |
|---|---|---|---|
| 6,845,311 B1* | 1/2005 | Stratton | E02F 3/847 |
| | | | 37/417 |
| 9,139,977 B2 | 9/2015 | McCain et al. | |
| 9,988,787 B1* | 6/2018 | Wang | G05D 1/0212 |
| 10,066,370 B2* | 9/2018 | Faivre | E02F 9/2029 |
| 2007/0010925 A1 | 1/2007 | Yokoyama et al. | |
| 2011/0169949 A1 | 7/2011 | McCain et al. | |
| 2013/0081836 A1 | 4/2013 | Hayashi et al. | |
| 2016/0312434 A1 | 10/2016 | Shintani et al. | |
| 2017/0016211 A1 | 1/2017 | Arimatsu et al. | |
| 2019/0390443 A1 | 12/2019 | Yamamoto et al. | |

FOREIGN PATENT DOCUMENTS

| | | |
|---|---|---|
| JP | 2005-194825 A | 7/2005 |
| JP | 2005-233417 A | 9/2005 |
| JP | 4311577 B2 | 8/2009 |
| JP | 2016-224038 A | 12/2016 |
| JP | 2018-145693 A | 9/2018 |
| WO | 2013/047180 A1 | 4/2013 |
| WO | 2017/010563 A1 | 1/2017 |
| WO | 2018/198761 A1 | 11/2018 |

OTHER PUBLICATIONS

The International Search Report for the corresponding international application No. PCT/JP2020/006052, dated Mar. 24, 2020.
The Office Action for the corresponding Chinese application No. 202080008591.0, dated Dec. 16, 2022.
The Office Action for the corresponding Japanese application No. 2019-027646, dated Nov. 8, 2022.
The Office Action for the corresponding Canadian application No. 3,124,936 dated Sep. 29, 2022.

* cited by examiner

CONTROL SYSTEM FOR WORK MACHINE

This application is a U.S. National stage application of International Application No. PCT/JP2020/006052, filed on Feb. 17, 2020. This U.S. National stage application claims priority under 35 U.S.C. § 119(a) to Japanese Patent Application No. 2019-027646, filed in Japan on Feb. 19, 2019, the entire contents of which are hereby incorporated herein by reference.

BACKGROUND

Field of the Invention

The present disclosure relates to a control system for a work machine.

Background Information

Conventionally, techniques for detecting the position of a work implement have been proposed for a work machine such as a bulldozer. For example, International Publication WO 2013-047180 is a work machine provided with a vehicle body, a work implement, an attitude sensor, a positional sensor, and a controller. The work implement is attached to the vehicle body. The positional sensor outputs position data that indicates the position of the vehicle body. The attitude sensor outputs attitude data which indicates the attitude of the vehicle body and the work implement. The controller calculates the position of the work implement based on the position data and the attitude data.

SUMMARY

The vehicle body includes a plurality of vehicle body portions that are provided separately from each other. For example, the vehicle body includes a first vehicle body portion and a second vehicle body portion. The first vehicle body portion includes a vehicle body frame. The second vehicle body portion includes an operating cabin. The first vehicle body portion and the second vehicle body portion are provided separately from each other. As a result, the second vehicle body portion can be displaced relative to the first vehicle body portion. In particular, when the second vehicle body portion is supported by the first vehicle body portion via a mount, the second vehicle body portion may become greatly displaced relative to the first vehicle body portion due to deformation of the mount.

In International Publication WO 2013-047180, the above-mentioned attitude sensor is attached to the first vehicle body portion and the positional sensor is attached to the second vehicle body portion. As a result, when the second vehicle body portion is displaced relative to the first vehicle body portion, the attitude of the second vehicle body portion becomes different from the attitude of the first vehicle body portion detected by the attitude sensor. In this case, it is difficult to accurately calculate the position of the work implement.

An object of the present disclosure is to accurately calculate a position of a work implement.

A first aspect is a control system for a work machine. The work machine includes a work implement and a vehicle body. The vehicle body includes a first vehicle body portion, a mount, and a second vehicle body portion. The work implement is attached to the first vehicle body portion. The mount is attached to the first vehicle body portion. The second vehicle body portion is provided separately from the first vehicle body portion. The second vehicle body portion is supported on the first vehicle body portion via the mount.

The control system includes a vehicle body positional sensor, a work implement positional sensor, and a controller. The vehicle body positional sensor is attached to the second vehicle body portion. The vehicle body positional sensor outputs vehicle body position data which indicates a position of the second vehicle body portion. The work implement positional sensor is attached to the second vehicle body portion. The work implement positional sensor outputs work implement position data. The work implement position data indicates a relative position of the work implement with respect to the second vehicle body portion. The controller calculates the position of the work implement based on the vehicle body position data and the work implement position data.

According to the present disclosure, the vehicle body positional sensor and the work implement positional sensor are both attached to the second vehicle body portion. As a result, even if the second vehicle body portion is displaced relative to the first vehicle body portion, the position of the work implement can be calculated accurately.

DETAILED DESCRIPTION OF EMBODIMENT(S)

Figure 1:
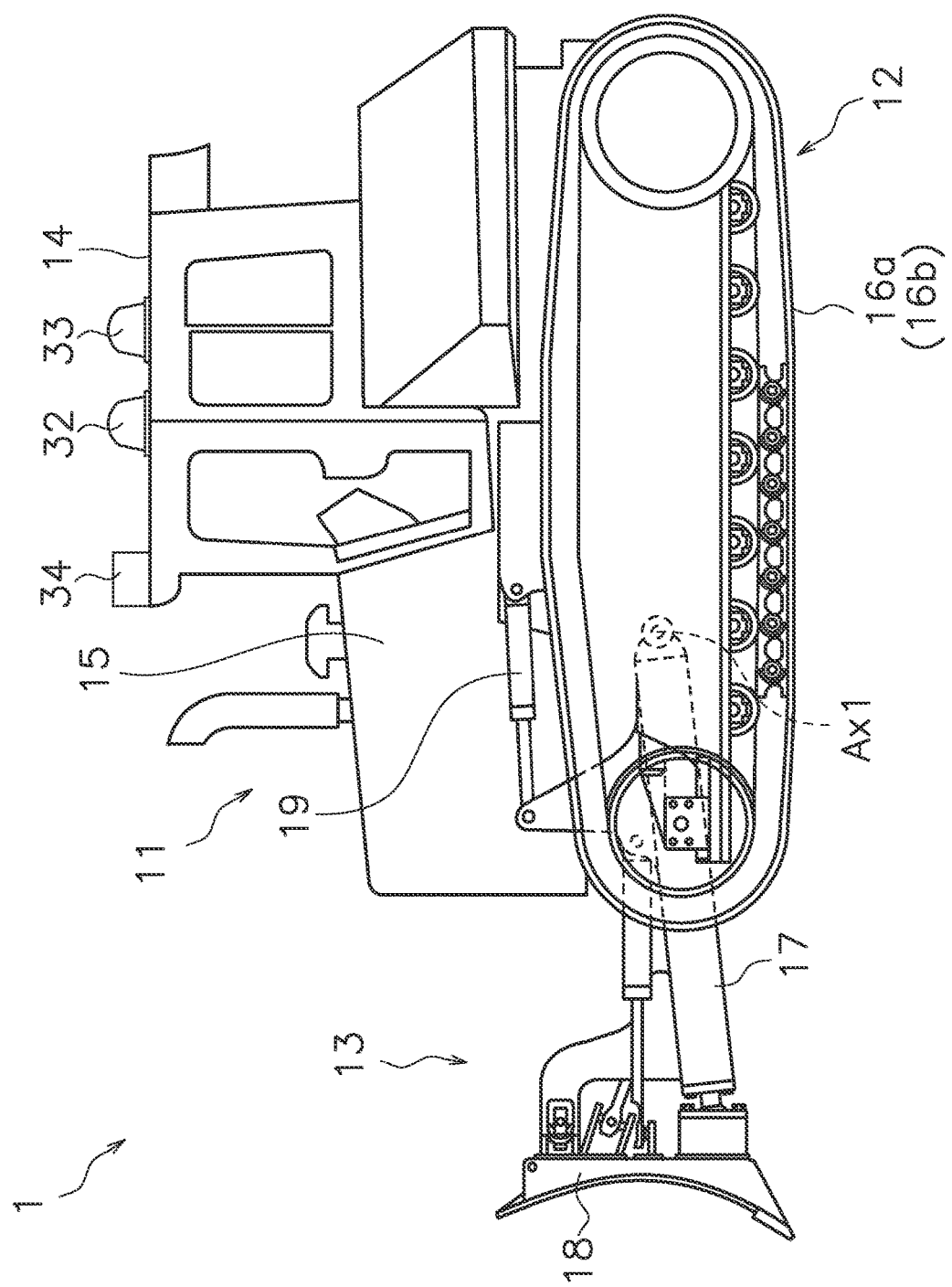
FIG. 1 is a side view of a work machine according to an embodiment.

A work vehicle according to an embodiment is discussed hereinbelow with reference to the drawings. FIG. 1 is a side view of a work machine 1 according to the embodiment. The work machine 1 according to the present embodiment is a bulldozer. The work machine 1 includes a vehicle body 11, a travel device 12, and a work implement 13.

The vehicle body 11 has an operating cabin 14 and an engine compartment 15. An operators seat that is not illustrated is disposed inside the operating cabin 14. The engine compartment 15 is disposed in front of the operating cabin 14. The travel device 12 is attached to a bottom part of the vehicle body 2. The travel device 12 includes left and right crawler belts 16a and 16b. Only the crawler belt 16a on the left side is illustrated in FIG. 1. The work machine 1 travels due to the rotation of the crawler belts 16a and 16b.

The work implement 13 is attached to the vehicle body 11. The work implement 1 has a lift frame 17, a blade 18, and a lift cylinder 19. The lift frame 17 is attached to the vehicle body 11 in a manner that allows movement up and down about an axis Ax1. The axis Ax1 extends in the vehicle width direction. The lift frame 17 supports the blade 18.

The blade 18 is disposed in front of the vehicle body 11. The blade 18 moves up and down accompanying the up and down movements of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 moves up and down about the axis Ax1.

Figure 2:
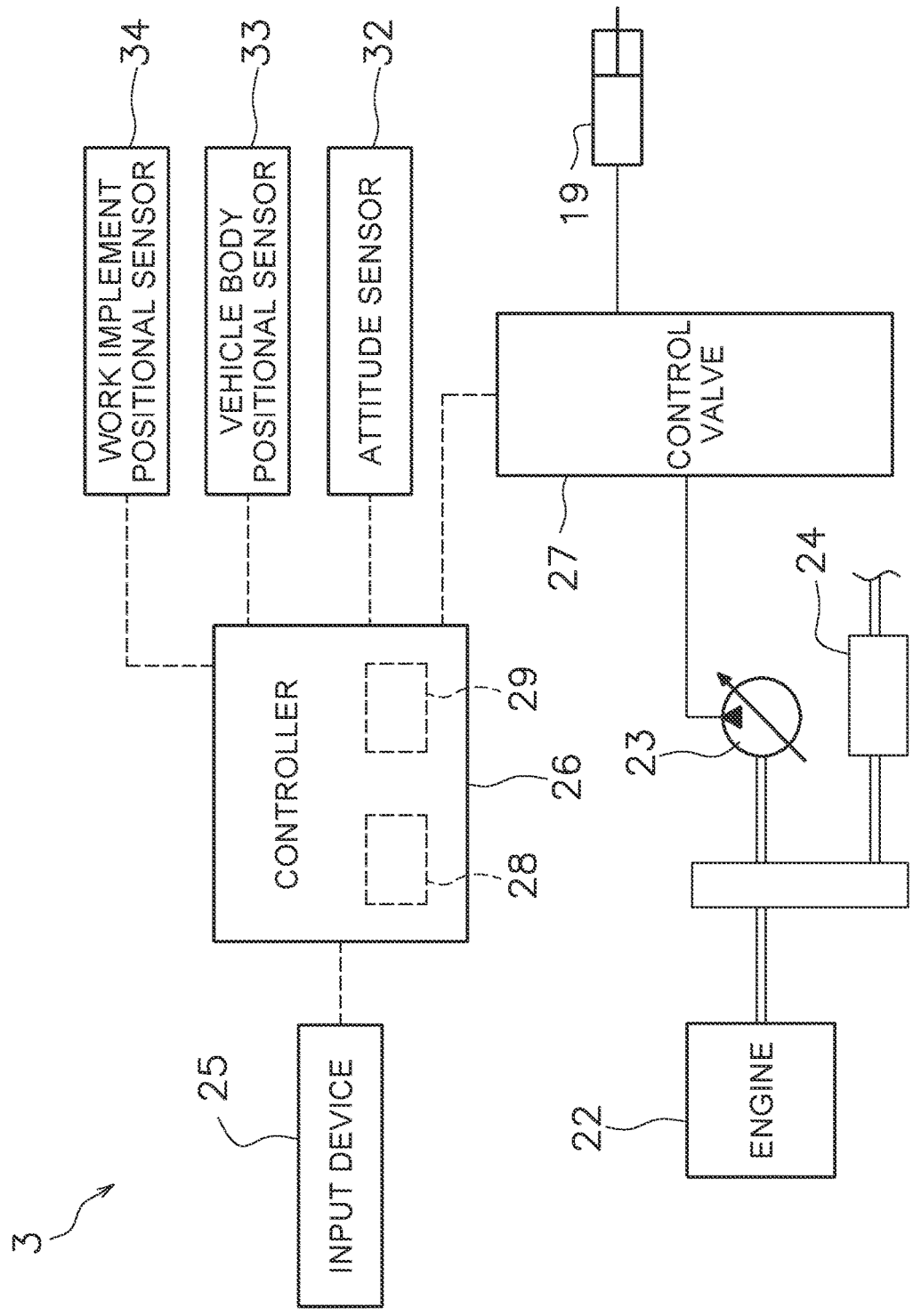
FIG. 2 is a block diagram illustrating a configuration of a control system of the work machine.

FIG. 2 is a block diagram of a configuration of a control system 3 of the work machine 1. In the present embodiment, the control system 3 is mounted in the work machine 1. As illustrated in FIG. 2, the work machine 1 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits the driving power of the engine 22 to the travel device 12. The power transmission device 24 may be, for example, a hydrostatic transmission (HST). Alternatively, the power transmission device 24 may be, for example, a transmission having a torque converter or a plurality of speed change gears.

The control system 3 includes an input device 25, a controller 26, and a control valve 27. The operating device 25 is disposed in the operating cabin 14. The input device 25 receives operations by an operator and outputs operation signals corresponding to the operations. The input device 25 outputs the operation signals to the controller 26. The input device 25 includes operation pieces such as an operating lever, a pedal, or a switch for operating the travel device 12 and the work implement 13. The input device 25 may include a touch screen. The travel of the work machine 1 such as forward travel or reverse travel is controlled in accordance with the operation of the input device 25. The operation of the work implement 13 such as raising or lowering is controlled in accordance with the operation of the input device 25.

The controller 26 is programmed to control the work machine 1 based on acquired data. The controller 26 includes a storage device 28 and a processor 29. The storage device 28 includes a non-volatile memory such as a ROM and a volatile memory such as a RAM. The storage device 28 may include an auxiliary storage device such as a hard disk or a solid state drive (SSD). The storage device 28 is an example of a non-transitory computer-readable recording medium. The storage device 28 stores computer commands and data for controlling the work machine 1.

The processor 29 is, for example, a central processing unit (CPU). The processor 29 executes processing for controlling the work machine 1 in accordance with a program. The controller 26 controls the travel device 12 or the power transmission device 24 thereby causing the work machine 1 to travel. The controller 26 controls the control valve 27 whereby the blade 18 is moved up and down.

The control valve 27 is a proportional control valve and is controlled with command signals from the controller 26. The control valve 27 is disposed between the hydraulic pump 23 and hydraulic actuators such as the lift cylinder 19. The control valve 27 controls the flow rate of the hydraulic fluid supplied from the hydraulic pump 23 to the lift cylinder 19. The controller 26 generates a command signal for the control valve 27 so that the blade 18 moves. As a result, the lift cylinder 19 is controlled. The control valve 27 may also be a pressure proportional control valve. Alternatively, the control valve 27 may be an electromagnetic proportional control valve.

Figure 3A:
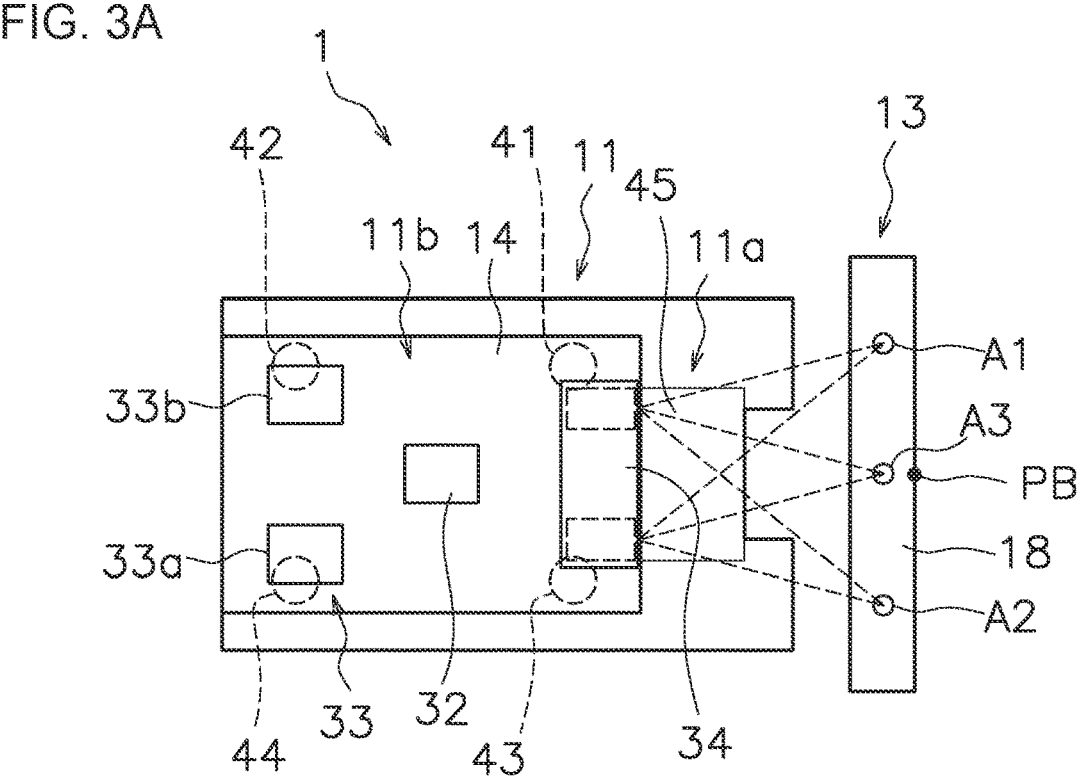
FIG. 3A is a top view and FIG. 3B is a side view schematically illustrating the work machine.
Figure 3B:
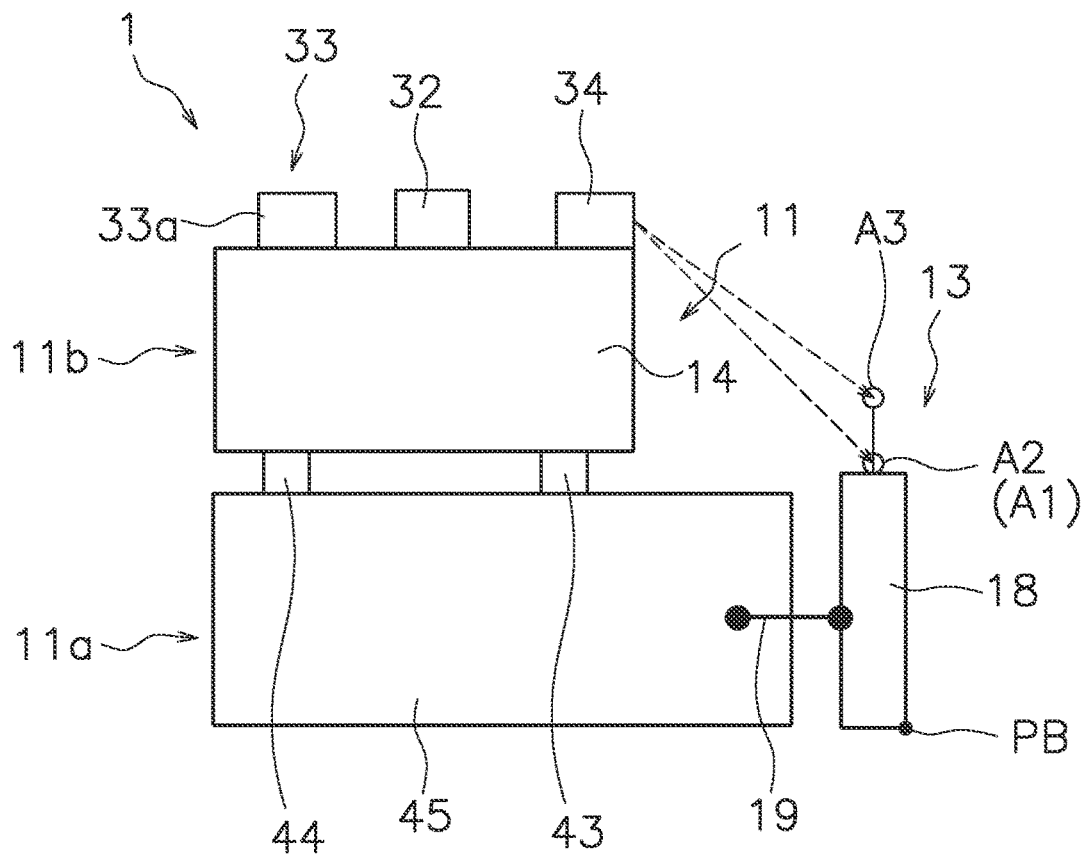

FIG. 3A is a schematic top view of the work machine 1. FIG. 3B is a schematic side view of the work machine 1. As illustrated in FIG. 3A and FIG. 3B, the vehicle body 11 includes a first vehicle body portion 11a, a second vehicle body portion 11b, and mounts 41 to 44.

The first vehicle body portion 11a includes a vehicle body frame 45. The work implement 3 is attached to the vehicle body frame 45. Specifically, the aforementioned lift frame 17 is attached to the vehicle body frame 45. The lift cylinder 19 is attached to the vehicle body frame 45. The travel device 12 is attached to the vehicle body frame 45.

The mounts 41 to 44 are attached to the first vehicle body portion 11a. The mounts 41 to 44 dampen vibrations or shocks transmitted from the first vehicle body portion 11a to the second vehicle body portion 11b. The mounts 41 to 44 are, for example, a combination of hydraulic and spring-type devices. Alternatively, the mounts 41 to 94 may be made of elastic bodies such as rubber. Alternatively, the mounts 41 to 94 may be omitted.

The second vehicle body portion 11b is provided separately from the first vehicle body portion 11a. The second vehicle body portion 11b includes the aforementioned operating cabin 14. The second vehicle body portion 11b is disposed above the first vehicle body portion 11a. The second vehicle body portion 11b is attached to the first vehicle body portion 11a. The second vehicle body portion 11b is supported on the first vehicle body portion 11a via the mounts 41 to 94.

As illustrated in FIG. 2 and FIGS. 3A and 3B, the control system 3 includes an attitude sensor 32, a vehicle body positional sensor 33, and a work implement positional sensor 34. The attitude sensor 32, the vehicle body positional sensor 33, and the work implement positional sensor 34 are attached to the second vehicle body portion 11b. For example, the attitude sensor 32, the vehicle body positional sensor 33, and the work implement positional sensor 34 are attached to the operating cabin 14.

The attitude sensor 32 outputs attitude data which indicates the attitude of the second vehicle body portion 11b. The attitude sensor 32 includes, for example, an inertial measurement unit (IMU). The attitude data includes a pitch angle and a roll angle. The pitch angle is the angle of the second vehicle body portion 11b in the front-back direction with respect to the horizon. The roll angle is the angle of the second vehicle body portion 11b in the width direction with respect to the horizon. The attitude sensor 32 outputs the attitude data to the controller 26.

The vehicle body positional sensor 33 includes receivers 33a and 33b for a global navigation satellite system (GNSS) such as a global positioning system (GPS). The receivers 33a and 33b receive positioning signals from a satellite. The receivers 33a and 33b output signals indicating the positions of the receivers 33a and 33b based on the positioning signals. The controller 26 acquires vehicle body position data from the positions of the receivers 33a and 33b. The vehicle body position data indicates the position and azimuth of the second vehicle body portion 11b in a global coordinate system. The global coordinates indicate the position in a geographical coordinate system.

The work implement positional sensor 34 acquires work implement position data. The work implement position data indicates the position of the work implement 13 in a vehicle body coordinate system. The vehicle body coordinate system is a coordinate system based on the second vehicle body portion 11b. Specifically, the vehicle body coordinate system is based on the positions of the receivers 33a and 33b. However, the vehicle body coordinate system may be based on positions other than the positions of the receivers 33a and 33b. For example, the work implement positional sensor 34 may be a stereo camera. As illustrated in FIG. 3A, the work implement positional sensor 34 captures images including predetermined characteristic points A1, A2, and A3 on the work implement 13. The work implement positional sensor 34 acquires the relative position of the work implement 13 with respect to the second vehicle body portion 11b from the images. Specifically, the work implement positional sensor 34 detects the azimuth and distance of the work implement 13 with respect to the second vehicle body portion 11b, as the work implement position data. However, the work implement position data may be coordinates of the work implement 13 based on the second vehicle body portion 11b.

The controller 26 computes a blade tip position PB of the work implement 13 from the work implement position data, the vehicle body position data, and the attitude data. Specifically, the controller 26 calculates the position of a reference point of the second vehicle body portion 11b in the global coordinate system based on the vehicle body position data. The controller 26 calculates the position of the blade tip position PB in the vehicle body coordinate system based on the work implement position data and machine data.

The machine data is recorded in the storage device 28. The machine data indicates the relative positions of the attitude sensor 32, the vehicle body positional sensor 33, and the work implement positional sensor 34 on the second vehicle body portion 11b. That is, the machine data includes the position of the attitude sensor 32 in the vehicle body coordinate system. The machine data includes the position of the vehicle body positional sensor 33 in the vehicle body coordinate system. The machine data includes the position of the work implement positional sensor 34 in the vehicle body coordinate system. Specifically, the machine data includes the distances from the characteristic points A1, A2, and A3 to the blade tip position PB.

The controller 26 calculates the position of the blade tip position PB in the global coordinate system based on the position of the second vehicle body portion 11b in the global coordinate system and the position of the blade tip position PB in the vehicle body coordinate system, and the attitude data. The controller 26 acquires the blade tip position PB in the global coordinate system as blade tip position data.

The controller 26 performs automatic control of the work machine 1. The automatic control of the work machine 1 may be a semi-automatic control that is performed in accompaniment to manual operations by an operator. Alternatively, the automatic control of the work machine 1 may be a fully automatic control that is performed without manual operations by an operator. The controller 26 automatically controls the work implement 13 based on the blade tip position data.

Figure 4:
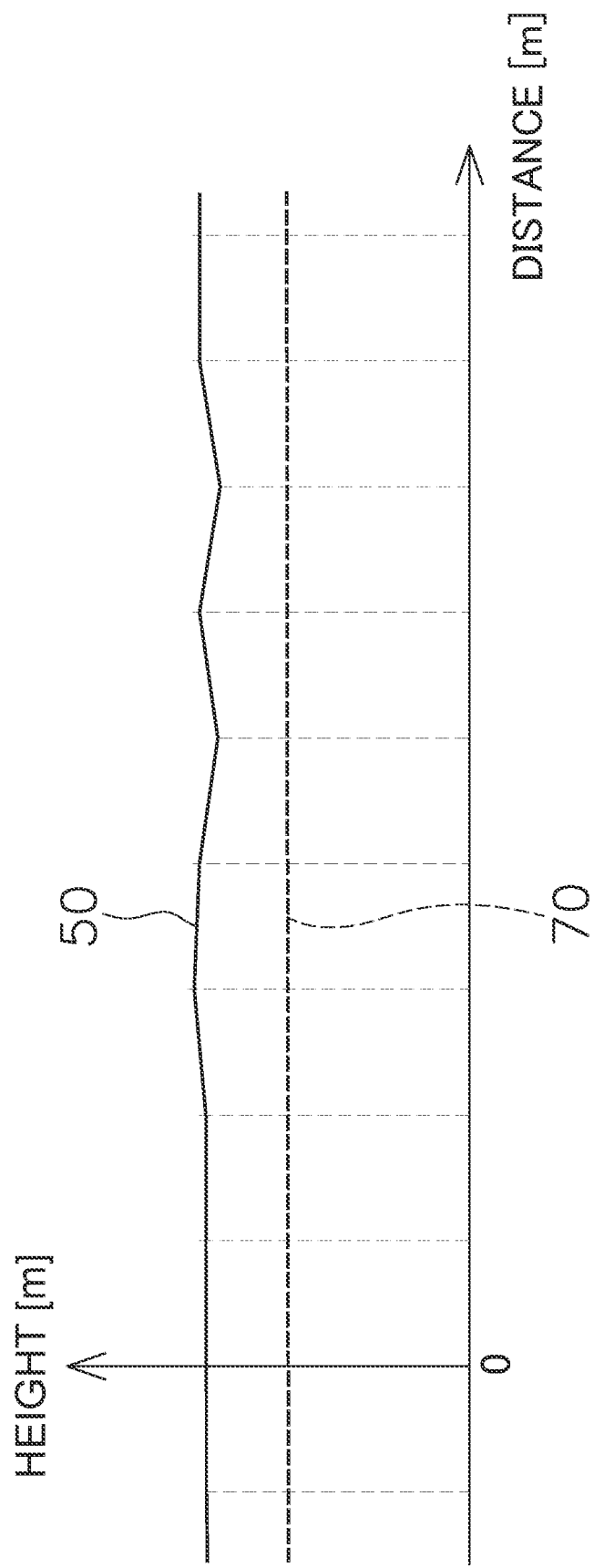
FIG. 4 is a side cross-sectional view illustrating current terrain data.

For example, as illustrated in FIG. 4, the controller 26 determines a target locus 70 of the work implement 13. For example, at least a portion of the target locus 70 is positioned below a current terrain 50. FIG. 4 is a side cross-section view of the target locus 70 and the current terrain 50. In FIG. 4, the vertical axis indicates the height of the terrain. The horizontal axis indicates the distance from the current position in the traveling direction of the work machine 1. The controller 26 causes the work implement 13 to move in accordance with the target locus 70.

Specifically, the controller 26 generates command signals for the work implement 13 so as to move the blade tip position PB of the blade 18 in accordance with the target locus 70. The controller 26 outputs the command signals to the control valve 27. Consequently, the work implement 13 moves in accordance with the target locus 70. The work machine 1 causes the work implement 13 to move in accordance with the target locus 70 while traveling forward. As a result, the current terrain 50 is excavated by the work implement 13.

Alternatively, the target locus 70 may be positioned higher than the current terrain 50. In this case, the work machine is able to perform earth piling work on the current terrain 50.

As explained above, in the control system 3 of the work machine 1 according to the present embodiment, the vehicle body positional sensor 33 and the work implement positional sensor 34 are both attached to the second vehicle body portion 11b. As a result, even if the second vehicle body portion 11b is displaced relative to the first vehicle body portion 11a, the position of the work implement 13 can be calculated accurately.

Figure 5:
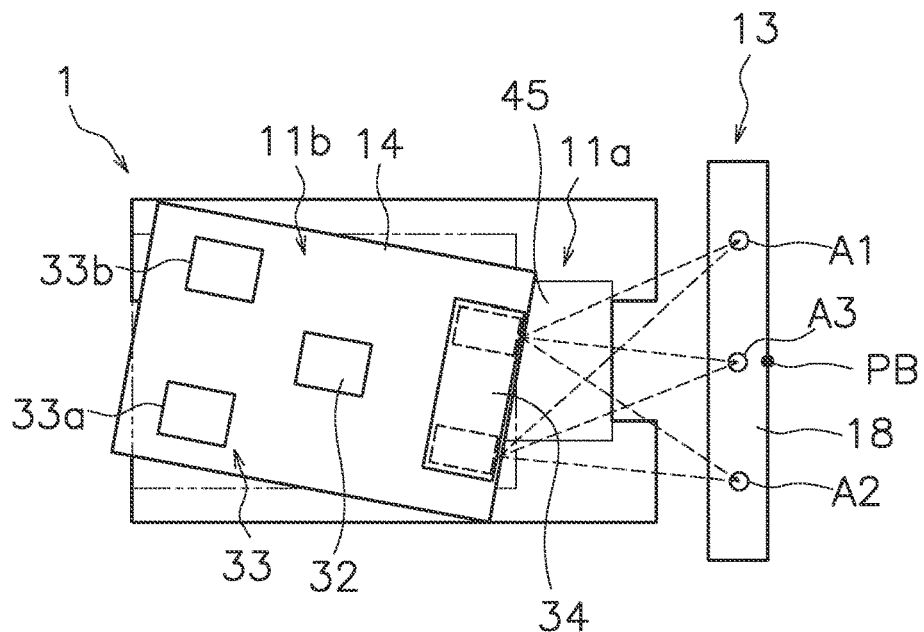
FIG. 5 is a top view illustrating the work machine according to the embodiment on sloped ground.

For example, FIG. 5 is a top view when the work machine 1 according to the present embodiment is on ground sloped in the roll direction. As illustrated in FIG. 5, in this state, the second vehicle body portion 11b is displaced in a twisted manner with respect to the first vehicle body portion 11a. As a result, the azimuth of the second vehicle body portion 11b differs from the azimuth of the first vehicle body portion 11a.

If the work implement positional sensor 34 were disposed on the first vehicle body portion 11a, the accuracy of the blade tip position PB of the work implement 13 would decrease due to the deviation in the azimuths of the vehicle body positional sensor 33 and the work implement positional sensor 34. However, in the work machine 1 according to the present embodiment, the vehicle body positional sensor 33 and the work implement positional sensor 34 are both attached to the second vehicle body portion 11b. As a result, even if the second vehicle body portion 11b is displaced in a twisted manner with respect to the first vehicle body portion 11a, the blade tip position PB of the work implement 13 can be calculated accurately.

Figure 6:
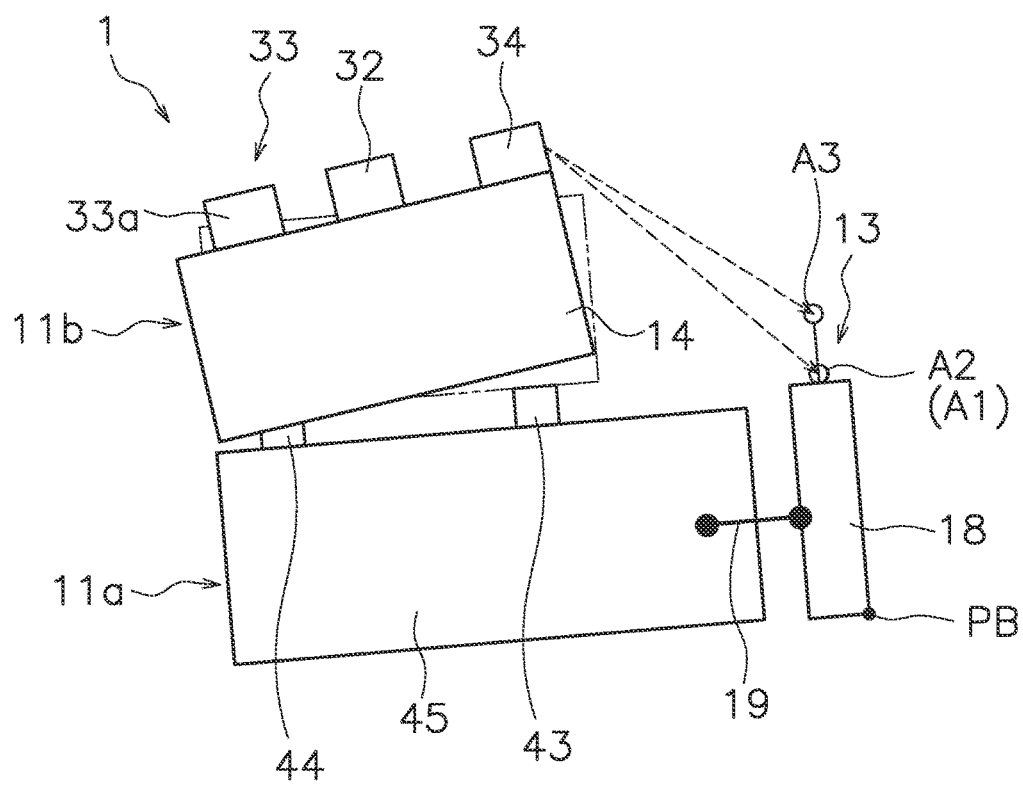
FIG. 6 is a side view illustrating the work machine according to the embodiment on sloped ground.

FIG. 6 is a side view when the work machine 1 according to the present embodiment is on ground sloped in the pitch direction. As illustrated in FIG. 6, in this state, the second vehicle body portion 11b is sloped in the pitch direction with respect to the first vehicle body portion 11a. As a result, the pitch angle of the second vehicle body portion 11b differs from the pitch angle of the first vehicle body portion 11a.

If the work implement positional sensor 34 were disposed on the first vehicle body portion 11a, the accuracy of the blade tip position PB of the work implement 13 would decrease due to the deviation in the pitch angles of the vehicle body positional sensor 33 and the work implement positional sensor 34. However, in the work machine 1 according to the present embodiment, the vehicle body positional sensor 33 and the work implement positional sensor 34 are both attached to the second vehicle body portion 11b. As a result, even if the second vehicle body portion 11b were sloped in the pitch direction with respect to the first vehicle body portion 11a, the blade tip position PB of the work implement 13 could be calculated accurately. Similarly, even if the second vehicle body portion 11b is sloped in the roll direction with respect to the first vehicle body portion 11a, the blade tip position PB of the work implement 13 could be calculated accurately.

Figure 7A:
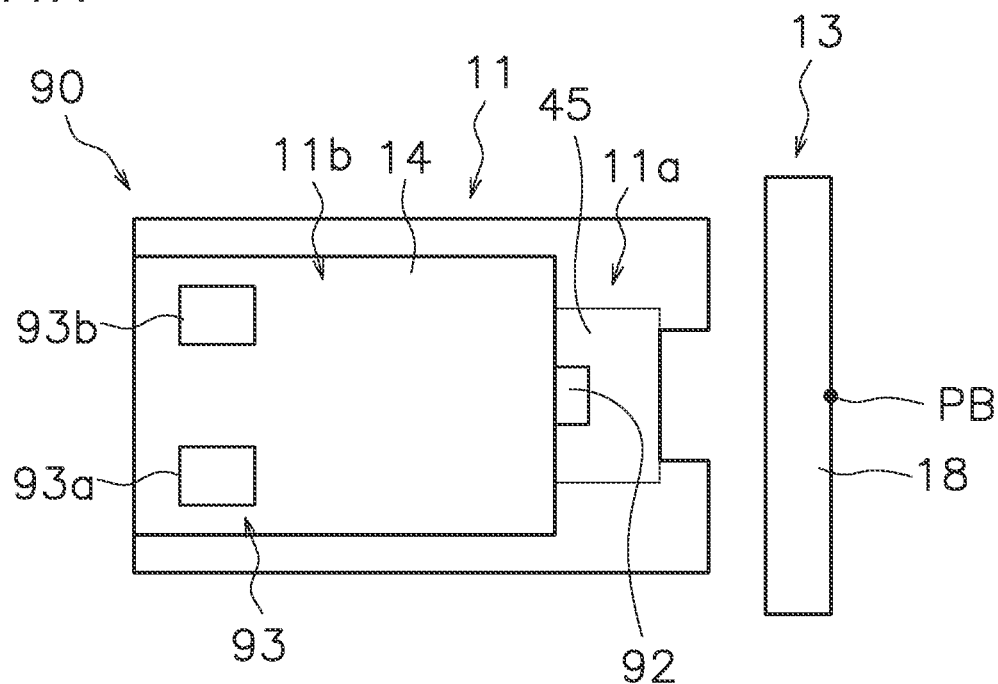
FIG. 7A is a top view and FIG. 7B is a side view schematically illustrating the work machine according to a comparative example.
Figure 7B:
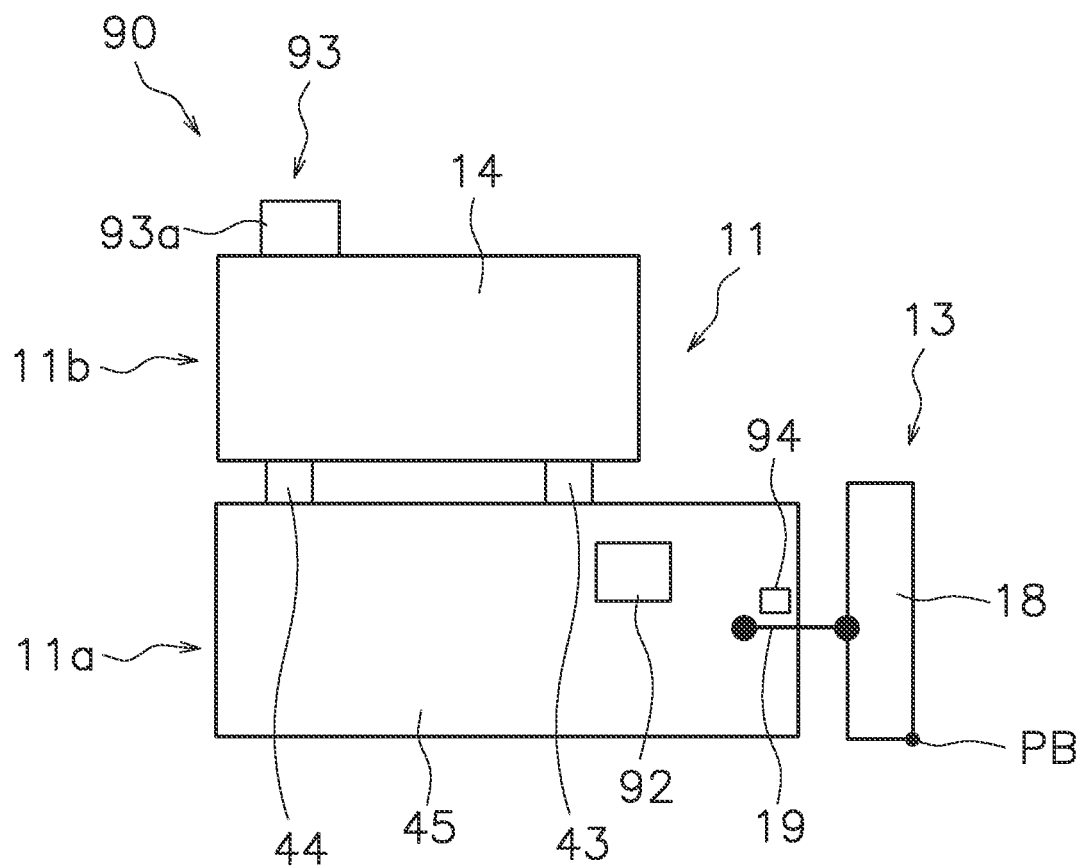

FIG. 7A is a top view of a work machine 90 according to a comparative example. FIG. 7B is a side view of the work machine 90 according to the comparative example. As illustrated in FIG. 7A and FIG. 7B, the work machine 90 according to the comparative example includes a vehicle body positional sensor 93 and a work implement positional sensor 94. The same reference symbols as the work machine 1 according to the embodiment are applied to the same portions as the work machine 1 according to the embodiment in the work machine 90 according to the comparative example.

An attitude sensor 92 has the same configuration as the attitude sensor 32 of the work machine 1 according to the present embodiment. However, the attitude sensor 92 is disposed on the first vehicle body portion 11a. The vehicle body positional sensor 93 includes receivers 93a and 93b. The vehicle body positional sensor 93 has the same configuration as the vehicle body positional sensor 33 of the work machine 1 according to the present embodiment. The vehicle body positional sensor 93 is disposed on the second vehicle body portion 11b.

The work implement positional sensor 94 is disposed on the first vehicle body portion 11a. In the work machine 90 according to the comparative example, the work implement positional sensor 94 is a stroke sensor of the lift cylinder 19. The work implement positional sensor 94 detects the stroke length of the lift cylinder 19. A controller (not illustrated) of the work machine 90 according to the comparative example calculates the lift angle of the work implement 13 from the stroke length of the lift cylinder 19. The lift angle of the work implement 13 indicates the position of the work implement 13 with respect to the first vehicle body portion 11a.

Figure 8:
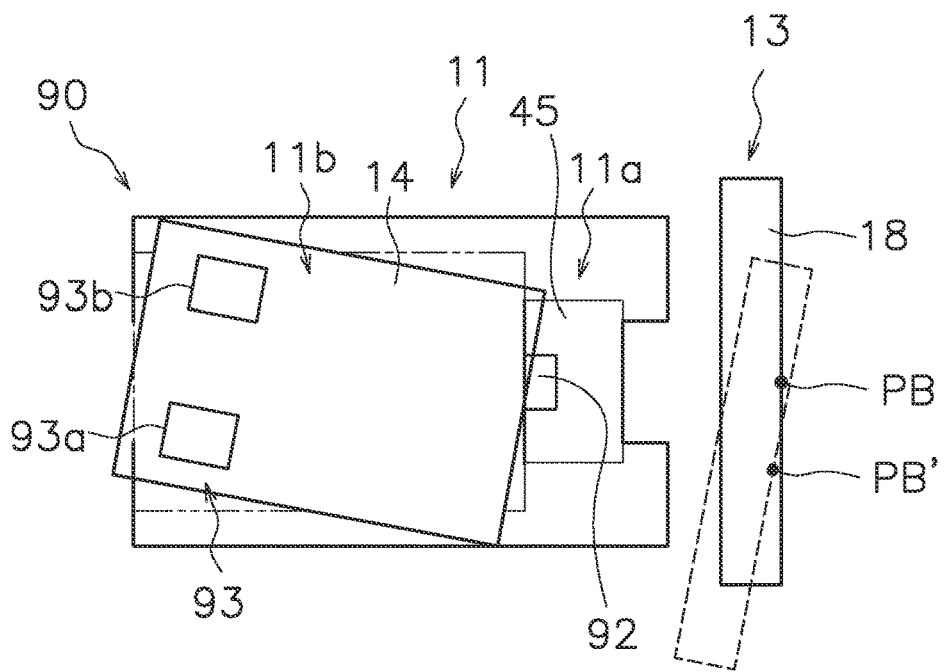
FIG. 8 is a top view illustrating the work machine according to the comparative example on sloped ground.

FIG. 8 is a top view when the work machine 90 according to the comparative example is on ground sloped in the roll direction. As illustrated in FIG. 8, in this state, the second vehicle body portion 11b is displaced in a twisted manner with respect to the first vehicle body portion 11a. As a result, the azimuth of the second vehicle body portion 11b differs from the azimuth of the first vehicle body portion 11a.

In the work machine 90 according to the comparative example, the blade tip position PB of the work implement 13 with respect to the first vehicle body portion 11a is calculated based on the lift angle of the work implement 13. As a result, in the work machine 90 according to the comparative example, the position PB' that differs from the actual position is calculated as the blade tip position PB of the work implement 13.

In contrast, in the work machine 1 according to the present embodiment, the work implement positional sensor 34 is attached to the second vehicle body portion 11b along with the vehicle body positional sensor 33. As a result, even if the second vehicle body portion 11b is twisted in the yaw direction with respect to the first vehicle body portion 11a, the blade tip position PB of the work implement 13 can be calculated accurately.

Figure 9:
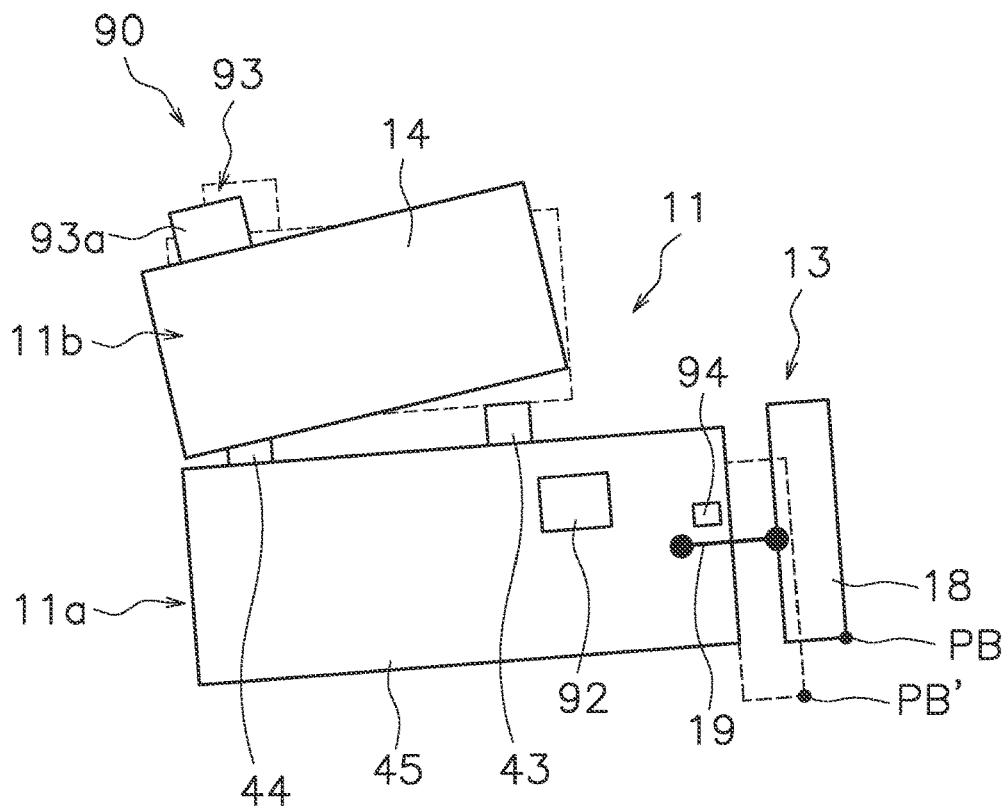
FIG. 9 is a side view illustrating the work machine according to the comparative example on sloped ground.

FIG. 9 is a side view when the work machine 90 according to the comparative example is on ground sloped in the pitch direction. As illustrated in FIG. 9, in this state, the second vehicle body portion 11b is sloped in the pitch direction with respect to the first vehicle body portion 11a. Therefore, the pitch angle of the second vehicle body portion 11b differs from the pitch angle of the first vehicle body portion 11a. In the work machine 90 according to the comparative example, the attitude sensor 92 is attached to the first vehicle body portion 11a. As a result, the blade tip position PB of the work implement 13 is calculated based on the pitch angle of the first vehicle body portion 11a. As a result, the controller of the work machine 90 according to the comparative example calculates the position PB' that differs from the actual position as the blade tip position PB of the work implement 13.

In contrast, in the work machine 1 according to the present embodiment, the attitude sensor 32 is attached to the second vehicle body portion 11b along with the vehicle body positional sensor 33 and the work implement positional sensor 34. As a result, even if the second vehicle body portion 11b is sloped in the pitch direction with respect to the first vehicle body portion 11a, the position of the work implement 13 can be calculated accurately. Similarly, even if the second vehicle body portion 11b is sloped in the roll direction with respect to the first vehicle body portion 11a, the blade tip position PB of the work implement 13 can be calculated accurately.

Although an embodiment of the present invention has been described so far, the present invention is not limited to the above embodiment and various modifications may be made within the scope of the invention.

The work machine 1 is not limited to a bulldozer, and may be another vehicle such as a wheel loader, a motor grader, a hydraulic excavator, or the like. The work machine 1 may be driven by an electric motor. In this case, the engine 22 and the engine compartment 15 may be omitted.

The controller 26 may have a plurality of controllers provided separately from each other. The abovementioned processing may be distributed and executed among the plurality of controllers.

Figure 10:
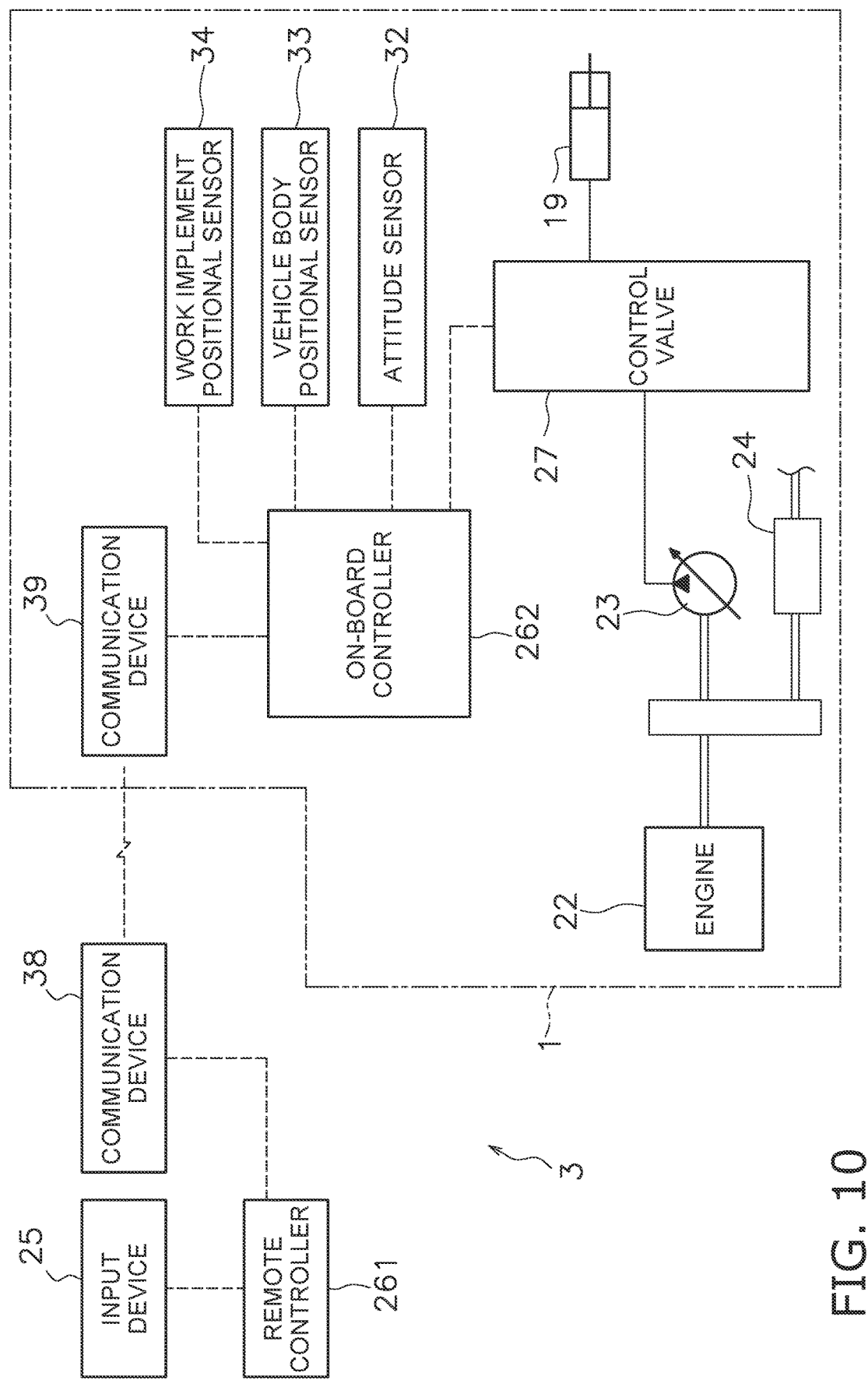
FIG. 10 is a block diagram illustrating a configuration of a control system of the work machine according to a modified example.

The work machine 1 may be a vehicle that can be remotely operated. In this case, a portion of the control system 3 may be disposed outside of the work machine 1. For example as illustrated in FIG. 10, the controller 26 may include a remote controller 261 and an on-board controller 262. The remote controller 261 may be disposed outside the work machine 1. For example, the remote controller 261 may be disposed in a management center outside of the work machine 1. The on-board controller 262 may be mounted on the work machine 1. The remote controller 261 and the on-board controller 262 may be able to communicate wirelessly through communication devices 38 and 39.

The position and/or number of the blade tip position PB is not limited to the above embodiment and may be changed. The abovementioned processing for calculating the blade tip position PB of the work implement 13 may be executed by the remote controller 261. Alternatively, the processing for calculating the blade tip position PB may be executed by the on-board controller 262. Alternatively, a portion of the processing for calculating the blade tip position PB may be executed by the remote controller 261 and the remaining processing may be executed by the on-board controller 262.

The input device 25 may be disposed outside of the work machine 1. The input device 25 may be omitted from the work machine 1. In this case, the operating cabin 14 may be omitted from the work machine 1.

The first vehicle body portion 11a is not limited to the vehicle body frame 45 and may be another constituent component of the work machine 1. The second vehicle body portion 11b is not limited to the operating cabin 14 and may be another constituent component of the work machine 1. For example, the first vehicle body portion 11a may be the vehicle body 11 from which the operating cabin 14 is omitted. The second vehicle body portion 11b may be a supporting member for a sensor attached to the vehicle body 11.

The number of receivers of the vehicle body positional sensor 33 is not limited to two and may be less than two or greater than two. The vehicle body positional sensor 33 is not limited to a GNSS receiver and may be another type of sensor. For example, the vehicle body positional sensor 33 may be a sensor for a local positioning system (LPS).

The attitude sensor 32 is not limited to an IMU and may be another type of sensor. For example, the attitude sensor 32 may be configured by three or more GNSS receivers.

The work implement positional sensor 34 is not limited to a stereo camera and may be another type of sensor. For example, the work implement positional sensor 34 may be a distance measuring device that irradiates light such as a light detection and ranging (LIDAR) device. Alternatively, the work implement positional sensor 34 may be a distance measuring device that emits radio waves such as a millimeter wave radar.

The coordinate systems in the above embodiment may be changed or omitted. For example, the global coordinate may be a coordinate system in the work site. Alternatively, the global coordinate may be omitted.

According to the present disclosure, even if the second vehicle body portion is displaced relative to the first vehicle body portion, the position of the work implement can be calculated accurately.

The invention claimed is:

1. A control system for a work machine including a work implement and a vehicle body, the vehicle body including
    a first vehicle body portion to which the work implement is attached,
    a mount attached to the first vehicle body portion, and
    a second vehicle body portion provided separately from the first vehicle body portion and supported on the first vehicle body portion via the mount,
the control system comprising:
    a vehicle body positional sensor that is attached to the second vehicle body portion and outputs vehicle body position data indicative of a position of the second vehicle body portion;
    a work implement positional sensor that is attached to the second vehicle body portion and outputs work implement position data indicative of a relative position of the work implement with respect to the second vehicle body portion; and
    a controller configured to calculate a position of the work implement based on the vehicle body position data and the work implement position data,
    the work implement positional sensor being configured to
        capture an image of the work implement and
        detect an azimuth and a distance of the work implement with respect to the second vehicle body portion from the image.

2. The control system according to claim 1, further comprising:
    an attitude sensor that outputs attitude data indicative of an attitude of the second vehicle body portion,
    the attitude sensor being attached to the second vehicle body portion.

3. The control system according to claim 1, wherein the vehicle body position data indicates the position of the second vehicle body portion in a coordinate system outside of the work machine.

4. The control system according to claim 3, further comprising:
    an attitude sensor that outputs attitude data indicative of an attitude of the second vehicle body portion,
    the attitude sensor being an IMU attached to the second vehicle body portion.

5. The control system according to claim 4, wherein the attitude sensor outputs a pitch angle and a roll angle indicative of the attitude of the second vehicle body portion.

6. The control system according to claim 1, wherein the mount is made of an elastic body.

7. The control system according to claim 1, wherein
    the first vehicle body portion includes a vehicle body frame that supports the work implement, and
    the second vehicle body portion includes an operating cabin.

8. The control system according to claim 1, wherein A control system for a work machine including a work implement and a vehicle body, the vehicle body including
    a first vehicle body portion to which the work implement is attached,
    a mount attached to the first vehicle body portion, and
    a second vehicle body portion provided separately from the first vehicle body portion and supported on the first vehicle body portion via the mount,
the control system comprising:
    a vehicle body positional sensor that is attached to the second vehicle body portion and outputs vehicle body position data indicative of a position of the second vehicle body portion;
    a work implement positional sensor that is attached to the second vehicle body portion and outputs work implement position data indicative of a relative position of the work implement with respect to the second vehicle body portion; and
    a controller configured to calculate a position of the work implement based on the vehicle body position data and the work implement position data,
    the work implement positional sensor detects being configured to detect an azimuth and a distance of the work implement with respect to the second vehicle body portion by emitting light or radio waves.

9. A control system for a work machine including a work implement and a vehicle body, the vehicle body including
    a first vehicle body portion to which the work implement is attached,
    a mount attached to the first vehicle body portion,
    a second vehicle body portion provided separately from the first vehicle body portion and supported on the first vehicle body portion via the mount,
    a vehicle body positional sensor that is attached to the second vehicle body portion and outputs vehicle body position data indicative of a position of the second vehicle body portion, and
    a work implement positional sensor that is attached to the second vehicle body portion and outputs work implement position data indicative of a relative position of the work implement with respect to the second vehicle body portion,
the control system comprising:
    a controller configured to
        acquire the vehicle body position data and the work implement position data, and
        calculate a position of the work implement based on the vehicle body position data and the work implement position data,
    the work implement positional sensor being configured to
        capture an image of the work implement and detect an azimuth and a distance of the work implement with respect to the second vehicle body portion from the image.

10. The control system as in claim 9, wherein the vehicle body further includes an attitude sensor that outputs attitude data indicative of an attitude of the second vehicle body portion, and the attitude sensor is attached to the second vehicle body portion.

11. The control method according to claim 9, wherein the vehicle body position data indicates the position of the second vehicle body portion in a coordinate system outside of the work machine.

12. The control system according to claim 9, wherein the mount is made of an elastic body.

13. The control system according to claim 9, wherein the first vehicle body portion includes a vehicle body frame that supports the work implement, and the second vehicle body portion includes an operating cabin.

14. A control system for a work machine including a work implement and a vehicle body, the vehicle body including
a vehicle body frame to which the work implement is attached, and
an operating cabin provided separately from the vehicle body frame and supported on the vehicle body frame,
the control system comprising:
a vehicle body positional sensor that is attached to the operating cabin and outputs vehicle body position data indicative of a position of the operating cabin;
a work implement positional sensor that is attached to the operating cabin and outputs work implement position data indicative of a relative position of the work implement with respect to the operating cabin; and
a controller configured to calculate a position of the work implement based on the vehicle body position data and the work implement position data
the work implement positional sensor being configured to capture an image of the work implement and
detect an azimuth and a distance of the work implement with respect to the second vehicle body portion from the image.

15. The control system according to claim 14, further comprising:
an attitude sensor that outputs attitude data indicative of an attitude of the operating cabin,
the attitude sensor being attached to the operating cabin.

16. The control system according to claim 14, wherein the vehicle body position data indicates the position of the operating cabin in a coordinate system outside of the work machine.

17. A control system for a work machine including a work implement and a vehicle body, the vehicle body including
a vehicle body frame to which the work implement is attached, and
an operating cabin provided separately from the vehicle body frame and supported on the vehicle body frame,
the control system comprising:
a vehicle body positional sensor that is attached to the operating cabin and outputs vehicle body position data indicative of a position of the operating cabin;
a work implement positional sensor that is attached to the operating cabin and outputs work implement position data indicative of a relative position of the work implement with respect to the operating cabin; and
a controller configured to calculate a position of the work implement based on the vehicle body position data and the work implement position data
the work implement positional sensor being configured to detect an azimuth and a distance of the work implement with respect to the operating cabin by emitting light or radio waves.

* * * * *